United States Patent
Elswick et al.

(10) Patent No.: US 11,001,269 B2
(45) Date of Patent: May 11, 2021

(54) ASSISTING USER ENGAGEMENT OF VEHICLE FEATURES

(71) Applicant: GM GLOBAL TECHNOLOGY OPERATIONS LLC, Detroit, MI (US)

(72) Inventors: Richard Elswick, Warren, MI (US); Steve P. Schwinke, Plymouth, MI (US); Chakradhar V. Velvadapu, Northville, MI (US); Rachelle M. Long, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 16/122,710

(22) Filed: Sep. 5, 2018

(65) Prior Publication Data
US 2020/0070846 A1 Mar. 5, 2020

(51) Int. Cl.
*B60W 50/00* (2006.01)
*B60W 50/04* (2006.01)

(52) U.S. Cl.
CPC . *B60W 50/0098* (2013.01); *B60W 2050/0005* (2013.01); *B60W 2050/0081* (2013.01); *B60W 2050/046* (2013.01)

(58) Field of Classification Search
CPC ..... B60W 50/0098; B60W 2050/0005; B60W 2050/046; B60W 2050/0081; B60W 2556/45; B60W 50/082; B60W 50/14; B60W 2050/146; B60W 50/00; B60W 2050/0077; B60K 35/00; B60K 2370/566; G08C 17/02
See application file for complete search history.

(56) References Cited

U.S. PATENT DOCUMENTS 10,325,519 B2 * 6/2019 Tan ........................ G09B 9/042
2017/0061826 A1 * 3/2017 Jain ...................... G09B 19/167

* cited by examiner

*Primary Examiner* — Michael V Kerrigan
(74) *Attorney, Agent, or Firm* — Cantor Colburn LLP

(57) ABSTRACT

A system and method of assisting user engagement of vehicle features, the method including: identifying a vehicle engagement feature from a plurality of vehicle engagement features; sending vehicle feature trigger information to a vehicle, the vehicle feature trigger information being information used to detect an occurrence of a vehicle feature trigger that corresponds to the identified vehicle engagement feature; transmitting a vehicle feature engagement notification to a vehicle user of the vehicle, the vehicle feature engagement notification including vehicle feature operating instructions and/or a vehicle feature availability notification; and receiving a vehicle feature usage indicator, the vehicle feature usage indicator indicating that the vehicle user has engaged the identified vehicle engagement feature, wherein the vehicle feature usage indicator is generated by a vehicle system module (VSM) of the vehicle in response to detection of the occurrence of the vehicle feature trigger at the vehicle.

20 Claims, 4 Drawing Sheets

ASSISTING USER ENGAGEMENT OF VEHICLE FEATURES

INTRODUCTION

The present invention relates to detecting vehicle user engagement of vehicle features.

Vehicles include hardware and software capable of obtaining and processing various information, including information that is obtained by vehicle system modules (VSMs). Moreover, vehicles include networking capabilities and can be connected to various vehicle backend servers. Vehicle information can be reported to a remote facility using such networking capabilities. Moreover, many vehicles include many vehicle features that can be operated or used by a vehicle operator or vehicle user.

SUMMARY

According to one aspect of the invention, there is provided a method of assisting user engagement of vehicle features, the method including: identifying a vehicle engagement feature from a plurality of vehicle engagement features; sending vehicle feature trigger information to a vehicle, the vehicle feature trigger information being information used to detect an occurrence of a vehicle feature trigger that corresponds to the identified vehicle engagement feature; transmitting a vehicle feature engagement notification to a vehicle user of the vehicle, the vehicle feature engagement notification including vehicle feature operating instructions and/or a vehicle feature availability notification; and receiving a vehicle feature usage indicator, the vehicle feature usage indicator indicating that the vehicle user has engaged the identified vehicle engagement feature, wherein the vehicle feature usage indicator is generated by a vehicle system module (VSM) of the vehicle in response to detection of the occurrence of the vehicle feature trigger at the vehicle.

According to various embodiments, this method may further include any one of the following features or any technically-feasible combination of some or all of these features:
- receiving vehicle state information from the vehicle and, in response to receiving the vehicle state information from the vehicle, carrying out the identifying step based on the received vehicle state information;
- the plurality of vehicle engagement features are stored as a predetermined master list of vehicle engagement features that are to be monitored for the vehicle user;
- the identifying step is carried out at a vehicle feature tracking server and wherein the transmitting step is carried out at a vehicle notification server in response to the vehicle notification server receiving an indication of the identified vehicle engagement feature from the vehicle feature tracking server;
- the vehicle feature usage indicator is received at the vehicle feature tracking server from the vehicle, the vehicle feature tracking server being separate from the vehicle notification server;
- sending a vehicle feature usage notification from the vehicle notification server to the vehicle user in response to the vehicle notification server receiving the vehicle feature usage indicator from the vehicle feature tracking server;
- the vehicle feature usage notification includes a gamification indicator, the gamification indicator indicating a vehicle user experience level and/or vehicle user experience points for the vehicle user;
- the vehicle user experience level and/or the vehicle user experience points are tracked for the vehicle user in combination with a vehicle type, the vehicle being of the vehicle type;
- the vehicle feature trigger information includes computer instructions that are executable by a processor of the vehicle; and/or
- the vehicle feature trigger information identifies the identified vehicle engagement feature, and wherein the vehicle is configured to activate tracking of the identified vehicle engagement feature through listing for an occurrence of the vehicle feature trigger.

According to another aspect of the invention, there is provided a method of assisting user engagement of vehicle features, the method being carried out by vehicle electronics of a vehicle, and wherein the method includes: receiving vehicle feature trigger information at the vehicle, the vehicle feature trigger information being information that corresponds to a vehicle engagement feature; in response to receiving the vehicle feature trigger information at the vehicle, automatically configuring the vehicle electronics of the vehicle to monitor for an occurrence of the vehicle feature trigger; after the configuring step, detecting the occurrence of the vehicle feature trigger at the vehicle; and when the occurrence of the vehicle feature trigger is detected at the vehicle, sending a vehicle feature usage indicator to a remote facility from the vehicle.

According to various embodiments, this method may further include any one of the following features or any technically-feasible combination of some or all of these features:
- the vehicle feature trigger information is received as a part of a manufacturing process of the vehicle;
- the vehicle feature trigger information is received at the vehicle from the remote facility;
- the vehicle feature trigger information includes computer instructions particular to the vehicle engagement feature and wherein the occurrence of the vehicle feature trigger is detected through executing the computer instructions on a processor of a first vehicle system module (VSM) of the vehicle electronics;
- executing the computer instructions using the processor of a first VSM of the vehicle electronics, wherein execution of the computer instructions causes the first VSM to listen for onboard vehicle sensor information corresponding to the vehicle engagement feature that is sent over a communications bus included as a part of the vehicle electronics;
- the onboard vehicle sensor information is sent by an onboard vehicle sensor to a second VSM, the first VSM being separate from the onboard vehicle sensor and the second VSM;
- receiving a vehicle feature usage notification from the remote facility or another remote facility, wherein the vehicle feature usage notification is received in response to the sending step;
- receiving a vehicle feature engagement notification, wherein the vehicle feature engagement notification includes vehicle feature operating instructions that instruct a vehicle user how to activate or operate the vehicle engagement feature using one or more vehicle inputs, and wherein the vehicle engagement feature is a user-operated vehicle feature; and presenting the vehicle feature operating instructions on a vehicle-user interface of the vehicle electronics; wherein the detecting step further comprises determining whether the vehicle user activated or operated the vehicle engagement feature by operating the one or more vehicle inputs according to the vehicle feature operating instructions;

the one or more vehicle inputs include inputs received from one or more vehicle-user interfaces; and/or the method is carried out using at least one computer program executing on at least one vehicle system module (VSM) of the vehicle electronics, and wherein the at least one computer program is stored on a non-transitory computer readable medium of the vehicle electronics.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below may be used to increase customer utilization and satisfaction with various vehicle features; and in doing so enables tracking whether the vehicle user has engaged with one or more of the vehicle features provided by a vehicle. Vehicles today include an increasing number of vehicle features, some of which are operable or activatable by a vehicle user. In at least some scenarios, a vehicle user may not know how to use (e.g., operate, activate) a vehicle feature and, thus, instructions can be sent to the vehicle user (e.g., to a handheld wireless device (HWD) of the vehicle user, to the vehicle) that indicate how a certain vehicle feature can be used or is preferably used. In some embodiments, a vehicle engagement feature can be identified and vehicle feature trigger information corresponding to the vehicle engagement feature can be generated (or otherwise obtained). The vehicle feature trigger information can be sent to the vehicle so that the vehicle can be ready (or placed in a state) for detecting usage of the vehicle engagement feature, such as through detecting whether an occurrence of a vehicle feature trigger has occurred. Once the vehicle detects the occurrence of the vehicle feature trigger, the vehicle user can be presented with a notification that indicates that the vehicle user has successfully carried out the vehicle engagement feature. In one embodiment, this notification can be sent from a remote vehicle notification server in response to receiving an indication from a remote vehicle feature tracking server that the vehicle detected the occurrence of the vehicle feature trigger corresponding to the vehicle engagement feature. The method and system described below may be implemented in a manner that encourages user participation and can include artificial intelligence (AI) processing and/or gamification features to help maximize user engagement.

Figure 1:
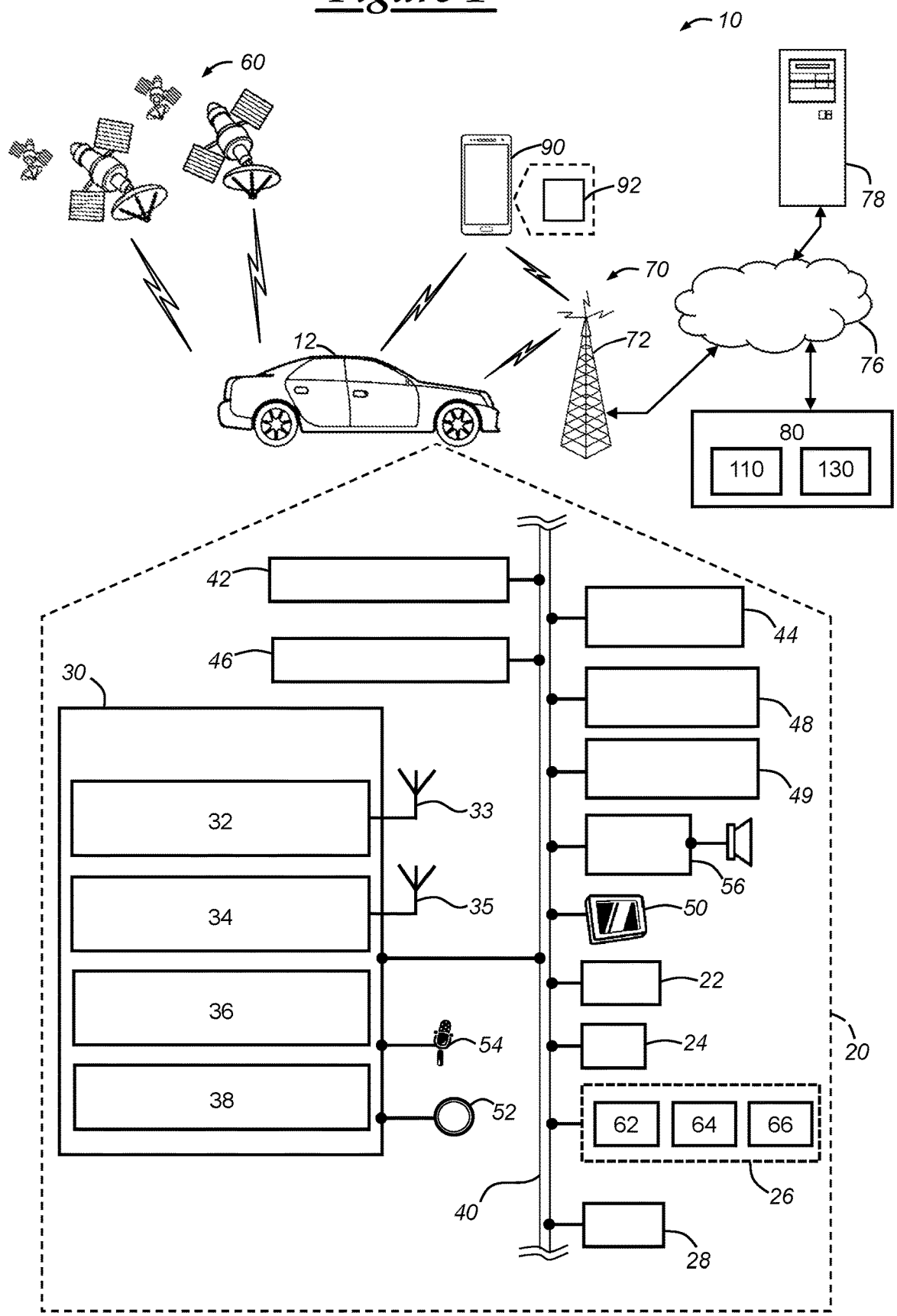
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and other VSMs 22-56, a constellation of global navigation satellite system (GNSS) satellites 60, one or more wireless carrier systems 70, a land communications network 76, a computer or server 78, a vehicle backend services facility 80, and a handheld wireless device (HWD) 90. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally in FIG. 1 and includes a global navigation satellite system (GNSS) receiver 22, a body control module or unit (BCM) 24, an engine control module (ECM) 26, other vehicle system modules (VSMs) 28, the wireless communications device 30, battery sensor(s) 42, movement sensor(s) 44, vision sensor(s) 46, windshield wipers 48, precipitation sensor(s) 49, and vehicle-user interfaces 50-56. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the GNSS receiver 22, the BCM 24, the ECM 26, the wireless communications device 30, the battery sensor(s) 42, the movement sensor(s) 44, the vision sensor(s) 46, the windshield wipers 48, the precipitation sensor(s) 49, and the vehicle-user interfaces 50-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 can be connected by communications bus 40 to the other VSMs, as well as to the wireless communications device 30, and can be programmed to run vehicle system and subsystem diagnostic tests. Moreover, each of the VSMs can include and/or be communicatively coupled to suitable hardware that enables intra-vehicle communications to be carried out over the communications bus 40; such hardware can include, for example, bus interface connectors and/or modems. One or more VSMs 28 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites 60. GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the vehicle operator. Navigation information can be presented on the display 50 (or other display within the vehicle) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the vehicle communications device (or other telematics-enabled device) installed in the vehicle, wherein the position information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in a car sharing service. Also, new or updated map data can be downloaded to the GNSS receiver 22 from the remote facility 80 via the wireless communications device 30.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 40. In some embodiments, the BCM 24 may be integrated with or part of a center stack module (CSM) and/or integrated with wireless communications device 30. Or, the BCM may be a separate device that is connected to other VSMs via bus 40. The BCM 24 can include a processor and/or memory, which can be similar to processor 36 and memory 38 of wireless communications device 30, as discussed below. The BCM 24 may communicate with wireless device 30 and/or one or more vehicle system modules, such as the engine control module (ECM) 26, battery sensor(s) 42, movement sensor(s) 44, vision sensor(s) 46, windshield wipers 48, precipitation sensor(s) 49, audio system 56, or other VSMs 28. The BCM 24 may include a processor and memory accessible by the processor. Suitable memory may include non-transitory computer-readable memory that includes various forms of RAM and ROM. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. For example, the BCM 24 can send signals to other VSMs, such as a request to perform a particular operation or a request for vehicle sensor data and, in response, the sensor may then send back the requested information. And, the BCM 24 may receive vehicle sensor data from VSMs, including battery sensor data or other sensor data from battery sensor(s) 42, movement sensor data from movement sensor 44, spatial or image data from vision sensor(s) 46, precipitation data or other sensor data from the precipitation sensor 49, and various other information or data from other VSMs.

Additionally, the BCM 24 may provide vehicle state information corresponding to the vehicle state of certain vehicle components or systems, including the VSMs discussed herein. For example, the BCM 24 may provide the device 30 with information indicating whether the vehicle's ignition is turned on (as received from ECM 26, for example), the gear the vehicle is presently in (i.e. gear state), and/or other information regarding the vehicle. The vehicle sensor data and/or vehicle operating state information that is received or obtained at the BCM 24 can be used to monitor usage or engagement of certain vehicle features (or operations) and, in some embodiments, the BCM 24 can be configured to monitor for usage or operation of certain vehicle features (or determine whether a vehicle feature trigger has been triggered (i.e., the occurrence of a vehicle feature trigger)) as specified in a vehicle feature trigger information that is received from the remote facility 80. For example, the vehicle electronics 20 (e.g., the BCM 24 and/or the wireless communications device 30) can be configured to listen for the occurrence of certain vehicle condition(s) (e.g., turning on windshield wipers 48) in response to receiving the vehicle feature trigger information from the remote facility 80. In one embodiment, in response to detecting the occurrence of the vehicle feature trigger at the BCM 24, the BCM 24 can send an indicator indicating this to the wireless communications device 30. And, in response to receiving this indicator, the wireless communications device 30 can send a vehicle feature usage indicator to the remote facility 80 (e.g., the vehicle feature tracking server 110) via cellular carrier system 70 and/or land network 76, as discussed more below.

Engine control module (ECM) 26 may control various aspects of engine operation such as fuel ignition and ignition timing. The ECM 26 is connected to the communications bus 40 and may receive operation instructions (or vehicle commands) from the BCM 24 or other vehicle system modules, such as the wireless communications device 30 or other VSMs 28. In one scenario, the ECM 26 may receive a command from the BCM to start the vehicle—i.e., initiate the vehicle ignition or other primary propulsion system (e.g., a battery powered motor). Moreover, the ECM 26 is an onboard vehicle sensor that can be used to obtain vehicle sensor information of the vehicle engine, such as from engine speed sensor 62, engine temperature sensor 64, and engine ignition timing sensor 66, all of which are also onboard vehicle sensors. In at least some embodiments when the vehicle is a hybrid or electric vehicle, a primary propulsion control module can be used instead of (or in addition to) the ECM 26, and this primary propulsion control module can be used to obtain status information regarding the primary mover (including electrical motor(s) and battery information).

The vehicle 12 includes various onboard vehicle sensors 42-46, 49, and 62-66, as well as certain vehicle-user interfaces 50-54 that can be utilized as onboard vehicle sensors. Generally, the sensors 42-46, 49-54, and 62-66 can obtain vehicle sensor data, which can include vehicle sensor values as measured or determined by the onboard vehicle sensor. Other information pertaining to either the operating state of the vehicle (the "vehicle operating state") or the environment of the vehicle (the "vehicle environmental state") can also be obtained or may be included in the vehicle sensor data. The vehicle sensor data can be sent to other VSMs, such as BCM 24 and the vehicle communications device 30, via communications bus 40. Also, in some embodiments, the vehicle sensor data can be sent with metadata, which can include data identifying the sensor (or type of sensor) that captured the vehicle sensor data, a timestamp (or other time indicator), and/or other data that pertains to the vehicle sensor data or vehicle sensor. The "vehicle operating state" refers to a state of the vehicle concerning the operation of the vehicle, which can include the operation of the primary mover (e.g., a vehicle engine, vehicle propulsion motors). The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

The battery sensor(s) 42, which can be installed into the vehicle as an onboard vehicle sensor, can include a battery voltage sensor, a battery current sensor, and a battery temperature sensor. The battery voltage sensor can be used to measure the voltage across terminals of a vehicle battery. The battery current sensor can be used to measure current provided by the vehicle battery, and the battery temperature sensor can be used to measure a temperature of the vehicle battery. In one particular embodiment, the battery voltage sensor, the battery current sensor, and the battery temperature sensor can be included in and/or integrated into a single module or sensor unit that is coupled to the battery. The battery sensor(s) 42 can be coupled to various other VSMs directly or via communications bus 40. In at least some embodiments when the vehicle is a hybrid or electric vehicle, at least one battery sensor can be used to monitor or sense certain battery information concerning a battery used as a part of the primary propulsion system of the vehicle. Additionally or alternatively, the battery sensor(s) 42 can be used to monitor or sense information concerning a battery that powers accessory components of the vehicle (e.g., a 12V battery).

The movement sensors 44 can be used to obtain movement or inertial information concerning the vehicle, such as vehicle speed, acceleration, yaw (and yaw rate), pitch, roll, and various other attributes of the vehicle concerning its movement as measured locally through use of onboard vehicle sensors. The movement sensors 44 can be mounted on the vehicle in a variety of locations, such as within an interior vehicle cabin, on a front or back bumper of the vehicle, and/or on the hood of the vehicle 12. The movement sensors 44 can be coupled to various other VSMs directly or via the communications bus 40. Movement sensor data can be obtained and sent to the other VSMs, including BCM 24 and/or wireless communications device 30.

In one embodiment, the movement sensors 44 can include wheel speed sensors, which can be installed into the vehicle as an onboard vehicle sensor. The wheel speed sensors are each coupled to a wheel of the vehicle 12 and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. The wheel speed sensors can include a tachometer that is coupled to a vehicle wheel and/or other rotating member. In some embodiments, wheel speed sensors can be referred to as vehicle speed sensors (VSS) and can be a part of an anti-lock braking (ABS) system of the vehicle 12 and/or an electronic stability control program. The electronic stability control program can be embodied in a computer program or application that can be stored on a non-transitory, computer-readable memory (such as that which is included in BCM 24 or memory 38). The electronic stability control program can be executed using a processor of BCM 24 (or processor 36 of the wireless communications device 30) and can use various sensor readings or data from a variety of vehicle sensors including sensor data from sensors 42-46, 49-54, and 62-66. In one embodiment, the electronic stability control program can be used to detect wheel slippage of the vehicle, such as that which may occur when the vehicle is driving during times of heavy precipitation.

Additionally, the movement sensors 44 can include one or more inertial sensors, which can be installed into the vehicle as an onboard vehicle sensor. The inertial sensor(s) can be used to obtain sensor information concerning the acceleration and the direction of the acceleration of the vehicle. The inertial sensors can be microelectromechanical systems (MEMS) sensor or accelerometer that obtains inertial information. The movement sensors 44 can include one or more yaw rate sensors, which can be installed into the vehicle as an onboard vehicle sensor. The yaw rate sensor(s) can obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors.

The movement sensors 44 can also include a steering wheel angle sensor, which can be installed into the vehicle as an onboard vehicle sensor. The steering wheel angle sensor is coupled to a steering wheel of vehicle 12 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 12 that runs from the back to the front. Sensor data and/or readings from the steering wheel angle sensor can be used in the electronic stability control program that can be executed on a processor of BCM 24 or processor 36.

And, additionally, the movement sensors 44 can include a throttle position sensor (TPS), which can be installed into the vehicle as an onboard vehicle sensor. The TPS that can be used to determine a position of a throttle device of vehicle 12. For example, the throttle position sensor can be coupled to an electronic throttle body or system that is controlled by an actuator (such as a gas pedal) via a throttle actuation controller. The TPS can measure throttle position in a variety of ways, including through using a pin that rotates according to the throttle position (e.g., the output of the throttle actuation controller) and that reads a voltage through the pin. This voltage data (or other data derived therefrom) can be sent to BCM 24, which can use such vehicle sensor data as a part of the electronic stability control program, as well as various other programs or applications. The movement sensors 44 can include various other sensors not explicitly mentioned here, including brake pedal position sensors and other sensors contributing to a change in movement (e.g., a change in direction or propulsion, as indicated by a sensor reading of a vehicle operation or as indicated by receiving an input that (typically) results in a change in direction or propulsion).

Vision sensor(s) 46 are each an onboard vehicle sensor and may be any type of sensor that obtains visual or spatial information concerning an area within or surrounding the vehicle 12. For example, the vision sensor(s) 46 can be cameras, radars, lidars, etc. The data obtained by the vision sensor(s) 46 may be sent to another vehicle system module (VSM) such as wireless communications device 30 and/or BCM 24 via communications bus 40. In one embodiment, the vision sensor(s) 46 include an electronic digital camera that is powered through use of a vehicle battery. The electronic digital camera may include a memory device and a processing device to store and/or process data that it captures or otherwise obtains, and can be any suitable camera type (e.g., charge coupled device (CCD), complementary metal oxide semiconductor (CMOS), etc.) with any suitable lens.

The vision sensor(s) 46 can be used to capture photographs, videos, and/or other information pertaining to light, which is collectively referred to herein as vision data and which is a particular type of vehicle sensor data. In one embodiment, the vision data can be image data, which is vision data that can be represented in a pixel array and can be captured using interlacing or progressive scanning techniques, as well as other similar or suitable techniques. The image data can be captured at a set or pre-configured scanning or sampling frequency, and the vision sensor(s) may be configured to obtain image data of a particular resolution. Once the image data is obtained through using the vision sensor(s) 46, the image data (or other vision data) can be processed and then sent to one or more other VSMs, including the wireless communications devices 30 and/or the BCM 24. The vision sensor(s) 46 can include processing capabilities that enable image processing techniques, including object recognition techniques, to be carried out at the vision sensor(s) 46. Or, in other embodiments, the cameras may send raw or formatted image data to another VSM, such as device 30 (or other central vehicle computer), which can then perform the image processing techniques.

The windshield wipers 48 are windshield wipers that are used to wipe across the windshield of the vehicle 12, such as for purposes of removing precipitation off of the windshield. Additionally or alternatively, the windshield wipers 48 can be used to wipe across a rear window, a side window, a vehicle headlight cover, or other surface of the vehicle. The windshield wipers 48 can be controlled by the BCM 24 (or other VSM) through sending control signals to the windshield wipers 48 via the communications bus 40. For example, a windshield wiper activation command can be sent from the BCM 24 to the windshield wipers 48 via the communications bus 40, and the windshield wiper activation command can instruct the windshield wiper(s) 48 to activate or otherwise operate in a particular manner. And, in at least some embodiments, the windshield wiper activation command can specify certain operating parameters, such as windshield wiper speed (or frequency). In one embodiment, the vehicle operator can operate a windshield wiper switch included on the vehicle that instructs the windshield wipers to activate (and/or activate at a certain speed/frequency). A windshield wiper switch position can be detected by the BCM 24, and, in at least some embodiments, this windshield wiper switch is considered an onboard vehicle sensor.

The precipitation sensor 49 is an onboard vehicle sensor and can detect the presence of rain or precipitation on the windshield (or other surface, such as those that the windshield wipers are configured to wipe). In one embodiment, the precipitation sensors 49 can include (or be) infrared light sensor(s) directed toward the windshield (or other window of the vehicle 12) to detect rain or other precipitation based on the amount of reflected light. Precipitation sensor information can be collected by the precipitation sensor 49 and then sent to the BCM 24 (or other VSM) over the communications bus 40. And, in one embodiment, the precipitation sensor 49 can indicate the presence of precipitation on the vehicle windshield (or vehicle window) and, in response, the windshield wipers can be operated (e.g., as commanded by the BCM 24 in response to the precipitation indication).

Additionally, the vehicle 12 can include other sensors not explicitly mentioned above, including parking sensors, lane change and/or blind spot sensors, lane assist sensors, ranging sensors (i.e., sensors used to detect the range between the vehicle and another object, such as through use of radar or lidar), tire-pressure sensors, fluid level sensors (including a fuel level sensor), brake pad wear sensors, V2V communication unit (which may be integrated into the wireless communications device 30, as discussed below), and interior or exterior temperature sensors.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the method discussed below. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In one embodiment, the wireless communications device 30 can be or include a telematics unit (or telematics control unit) that is capable of carrying out cellular communications using one or more cellular carrier systems 70. Or, in other embodiments, a separate telematics unit can be included in the vehicle and communicatively coupled to the wireless communications device 30. The telematics unit can be integrated with the GNSS receiver 22 so that, for example, the GNSS receiver 22 and the wireless communications device (or telematics unit) 30 are directly connected to one another as opposed to being connected via communications bus 40.

In some embodiments, the wireless communications device 30 can be configured to communicate wirelessly according to one or more short-range wireless communications (SRWC) such as any of the Wi-Fi™, WiMAX™, Wi-Fi Direct™, IEEE 802.11p, other vehicle to vehicle (V2V) communication protocols, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals. The SRWC circuit 32 may allow the device 30 to connect to another SRWC device, such as the HWD 90. Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

The wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a non-transitory computer-readable medium, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives.

The wireless communications device 30 can interface various VSMs of the vehicle 12 with one or more devices external to the vehicle 12, such as one or more networks or systems at remote facility 80. This enables various vehicle operations or features to be tracked by, for example, the vehicle backend services facility 80. For example, the wireless communications device 30 can receive vehicle sensor data from one or more onboard vehicle sensors 42-46, 49-54, and 62-66. Thereafter, the vehicle can send this data (or other data derived from or based on this data) to other devices or networks, such as the vehicle backend services facility 80.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information and that can obtain vehicle sensor data for use in various embodiments of the method(s) below. The pushbutton(s) 52 allow manual user input into the communications device 30 to provide other data, response, and/or control input (e.g., a windshield wiper activation or control switch). Audio system 56 provides audio output to a vehicle occupant and can be a dedicated, stand-alone system or part of the primary vehicle audio system. According to the particular embodiment shown here, audio system 56 is operatively coupled to both vehicle bus 40 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Additionally, the microphone 54 can be used as a decibel (db) noise level monitor (or sensor) that monitors the noise level in the vehicle. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GORSE technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80 (or vehicle feature tracking server 110, as discussed below). For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 can be some of a number of computers accessible via a private or public network such as the Internet. And, the computers 78 (only one shown in FIG. 1) can be used for one or more purposes, such as for providing peer-to-peer (P2P) vehicle sharing services to a plurality of vehicles and other electronic network computing devices, including vehicle 12. Other such accessible computers 78 can be, for example: a service center computer where diagnostic information and other vehicle data can be uploaded from the vehicle; a client computer used by the vehicle owner or other subscriber for various purposes, such as accessing and/or receiving vehicle sensor data (or other data), as well as setting up and/or configuring subscriber preferences or controlling vehicle functions; a car sharing server which coordinates registrations from a plurality of users who request to use a vehicle as part of a car sharing service; or a third party repository to or from which vehicle sensor data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12.

Figure 2:
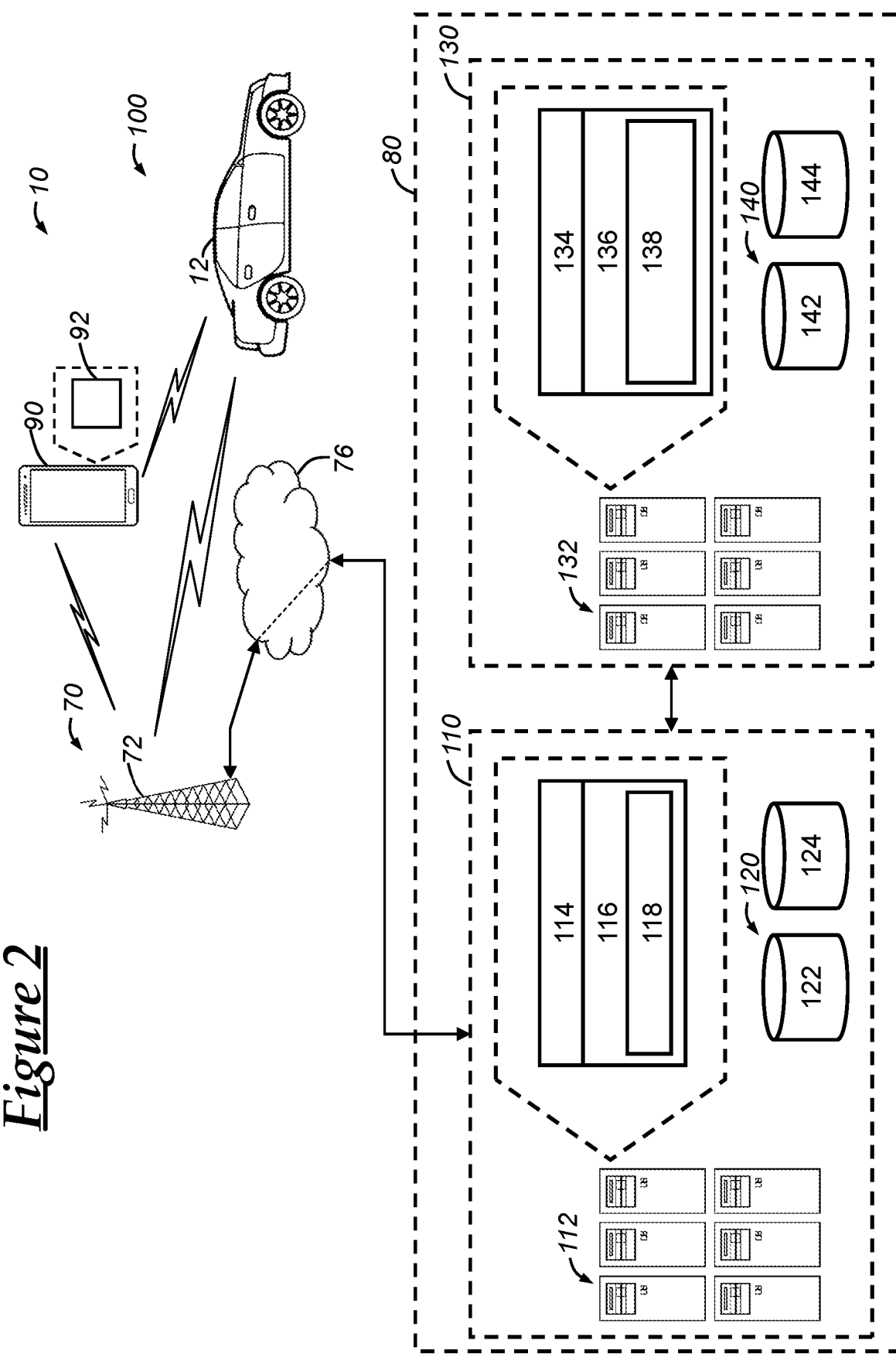
FIG. 2 is a block diagram depicting an embodiment of a vehicle feature tracking system.

Vehicle backend services facility 80 is a remote facility, meaning that it is located at a physical location that is located remotely from vehicle 12. The vehicle backend services facility 80 (or "remote facility 80" for short) may be designed to provide the vehicle electronics 20 with a number of different system back-end functions through use of one or more electronic servers, including a vehicle services management application. And, in many embodiments, the remote facility 80 can include the vehicle feature tracking server 110 and the vehicle notification server 130 (FIG. 2). The remote facility 80 includes vehicle backend services servers and databases, which may be stored on a plurality of memory devices. Also, remote facility 80 can include one or more switches, one or more live advisors, and/or an automated voice response system (VRS), all of which are known in the art. The remote facility 80 may include any or all of these various components and, preferably, each of the various components are coupled to one another via a wired or wireless local area network. The remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Remote facility 80 can use the information stored in databases to carry out one or more embodiments of the method(s) discussed herein, as well as a vehicle sensor configuration process and various other vehicle backend services functionality. As mentioned above, although only a single vehicle backend services facility 80 is illustrated, numerous vehicle backend services facilities can be used and, in such a case, the functionality of the numerous vehicle backend services facilities can be coordinated so that the vehicle backend services facilities can act as a single backend network or so that the operation of each facility is coordinated with the operation of the other facilities. And, the servers can be used to provide information stored in the databases to various other systems or devices, such as vehicles 12 or the HWD 90.

The handheld wireless device (HWD) 90 is a SRWC device (i.e., a device capable of SRWC) and may include: hardware, software, and/or firmware enabling cellular telecommunications and SRWC as well as other mobile device applications, such as a vehicle management application 92. The hardware of the HWD 90 may comprise: a processor and memory for storing the software, firmware, etc. The HWD processor and memory may enable various software applications, which may be preinstalled or installed by the user (or manufacturer) (e.g., having a software application or graphical user interface (GUI)). One implementation of the application 92 enables a vehicle user to communicate with the vehicle 12 and/or control various aspects or functions of the vehicle, some of which are listed above. Additionally, one or more applications may allow the user to connect with the remote facility 80 or call center advisors at any time. The application 92 can also provide a user interface for controlling various vehicle functionality.

In one particular embodiment, the HWD 90 can be a personal cellular SRWC device that includes a cellular chipset and/or cellular connectivity capabilities, as well as SRWC capabilities. Using a cellular chipset, for example, the HWD can connect with various remote devices, including computers 78 and remote server facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. In some embodiments, the HWD 90 is a personal SRWC device.

The processor of the HWD 90 can be any type of device capable of processing electronic instructions including microprocessors, microcontrollers, host processors, controllers, vehicle communication processors, and application specific integrated circuits (ASICs). The processor executes various types of digitally-stored instructions, such as software or firmware programs stored in memory of the HWD 90, which enable the device 90 to provide a wide variety of functionality. For instance, in one embodiment, the processor can execute programs (e.g., the vehicle management application 92) or process data. In some embodiments, the HWD 90 can be a smartphone or tablet that includes an operating system, such as Android™, iOS™, Microsoft Windows™, and/or other operating systems. The memory of the HWD 90 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives. In one embodiment, the memory of HWD 90 may be a non-volatile memory card, such as a Secure Digital™ (SD) card, that is inserted into a card slot of HWD 90.

The HWD 90 can also include a short range wireless communications (SRWC) circuit and/or chipset as well as one or more antennas, which allows it to carry out SRWC, such as any of the IEEE 802.11 protocols, Wi-Fi™, WiMAX™, ZigBee™, Wi-Fi Direct™ Bluetooth™, or near field communication (NFC). The SRWC circuit and/or chipset may allow the HWD 90 to connect to another SRWC device. Additionally, as mentioned above, the HWD 90 can include a cellular chipset thereby allowing the device to communicate via one or more cellular protocols, such as GSM/GPRS technology, CDMA or CDMA2000 technology, and LTE technology. The HWD 90 may communicate data over wireless carrier system 70 using the cellular chipset and an antenna. In many embodiments, the HWD 90 can be an HWD of a vehicle user and can include a vehicle management application 92, as depicted in the illustrated embodiment of FIG. 1.

With reference to FIG. 2, there is shown a detailed portion of the communications system 10, including a vehicle feature tracking system 100. In one embodiment, the vehicle feature tracking system 100 includes two separate server systems 110 and 130. While FIG. 2 depicts the two separate server systems 110, 130 as being located at a single remote facility 80, in other embodiments, these two separate server systems 110, 130 can be located at different remote facilities 80. Moreover, various instances of the server systems 110, 130 can be deployed to a plurality of remote facilities and, in such case, the operations performed by, and data stored at, each of these facilities can be coordinated across all instances of the server system 110, as well as for the all instances of server system 130. And, in other embodiments, a single server system can be used to carry out the functionality of the server systems 110, 130 as discussed below.

Figure 3:
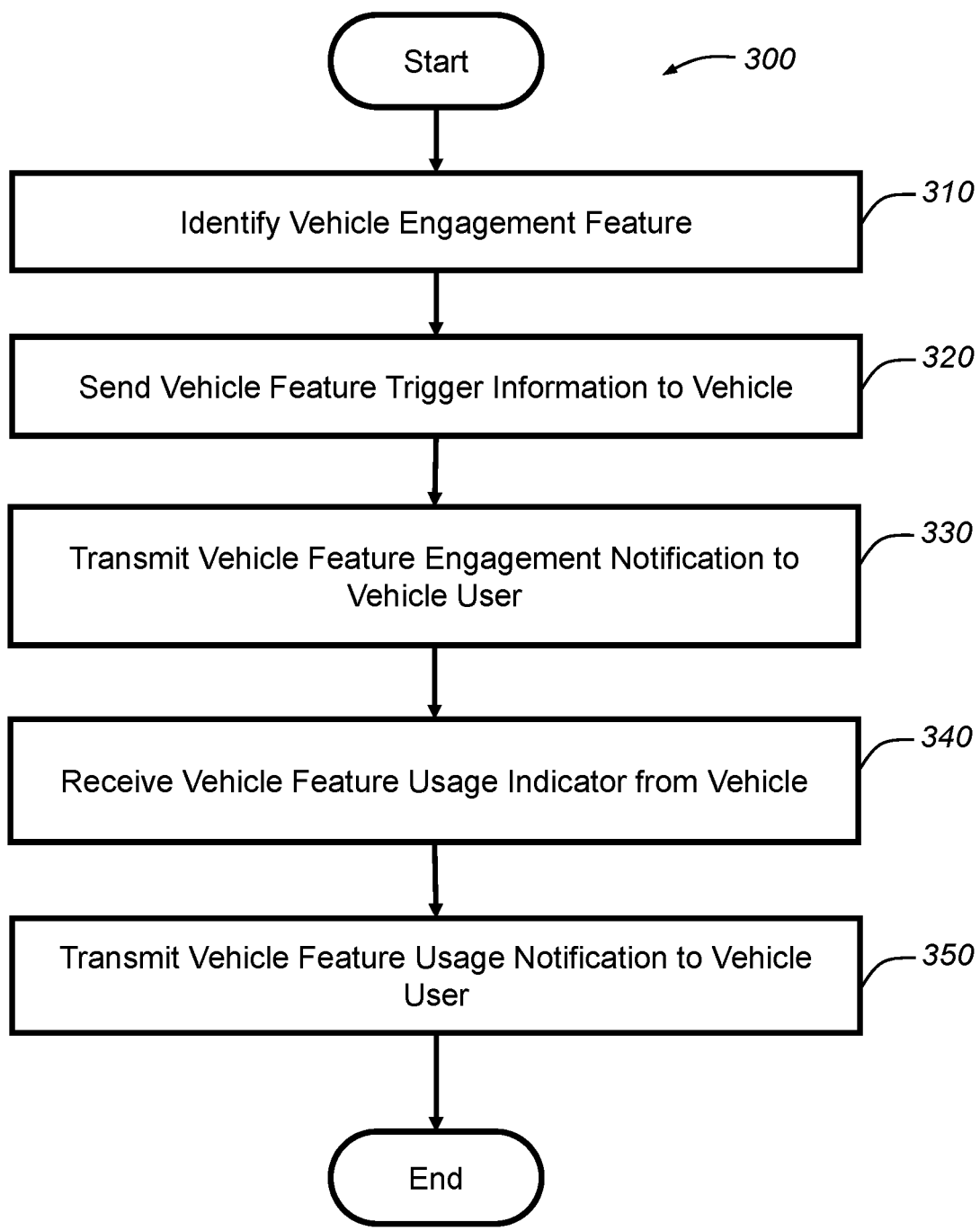
FIG. 3 is a flowchart of an embodiment of a method of assisting user engagement of vehicle features.

Each of the server systems 110, 130 include one or more servers 112, 132 and one or more databases 120, 140. Each of the one or more servers 112, 132 include a processor 114, 134, memory 116, 136, and an application (or computer program) 118, 138. The servers 112, 132 can each include NICs or WNICs, such as Ethernet ports (IEEE 802.3) or SRWC circuitry, as well as various other networking interfaces. Moreover, each of the one or more servers 112, 132 of a given system can be interconnected via one or more switches, routers, modems, etc. The memory 116, 136 can be a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. The memory 116, 136 can store the computer instructions that make up the applications 118, 138 and/or other information for use with applications 118, 138 or other applications. The processors 114, 134 can be any type of device capable of processing electronic instructions including microprocessors, microcontrollers, host processors, controllers, server-grade processors, and application specific integrated circuits (ASICs). The processors 114, 134 can be dedicated processors used only for servers 112, 132 or can be shared with other systems. The one or more processors 114, 134 can execute various types of digitally-stored instructions, such as software or firmware, which enable the servers 112, 132 to provide a wide variety of services, including some embodiments of the method discussed below, such as that which is described in the method 300 (FIG. 3).

Databases 120, 140 can be used to provide information to the servers 112, 132, such as for use in the respective application 118, 138. In one embodiment, databases 120, 140 can each include or be coupled to dedicated database servers that can implement a database abstraction layer (DBAL) and/or a database management system (DBMS) interface, and that operate to provide information from the databases; in other embodiments, the DBAL or DBMS interface can be implemented on servers 112, 132 using processor 114 (or another processor). The databases 120, 140 can each include one or more databases, such as databases 122, 124, 142, 144 as depicted in FIG. 2. In the case that the databases 120, 140 are carried out on a dedicated database server(s), the dedicated database server(s) can include their own processor, which can include any one or more of those that are discussed with respect to processors 114, 116. Moreover, the dedicated database server(s) can include memory, such as any one or more of those that are discussed with respect to memory 116, 136.

In particular, the server system 110 can be a vehicle feature tracking server system 110 (or "vehicle feature tracking server 110"). The vehicle feature tracking server 110 can include a vehicle feature monitoring application 118 that can be stored on memory 116 and executed by processor 114. In addition, the vehicle feature tracking application 118 can be used to generate (or otherwise obtain) one or more vehicle feature trigger information (or requests), which can then be sent to a one or more vehicles, such as the vehicle 12. This vehicle feature trigger information (or requests) can be generated and/or obtained based on information that is received from servers system 130 and/or on information stored in databases 120.

Databases 120 can be stored on a plurality of memory, and can include a vehicle feature information database 122 that can store vehicle feature information and other database(s) 124 that can store various vehicle information, such as vehicle sensor information (e.g., vehicle sensor data) that is received from one or more vehicles. In some embodiments, the vehicle sensor information can be included in the vehicle feature information database 122. The vehicle feature information is information that can be used to generate vehicle feature trigger information (or requests) for a particular vehicle and can include, for example, a master list of vehicle features for a particular vehicle (or type of vehicle) (e.g., for a given make and model year). The vehicle feature information can also include or be based on a master list of vehicle engagement features, which are vehicle features that are targeted for tracking vehicle user engagement. The vehicle feature information can indicate which of the vehicle engagement features of the master list that a particular vehicle user has carried out for a particular vehicle (or vehicle type). In some embodiments, the vehicle feature information can be associated with a particular vehicle (or vehicle type) and a particular vehicle user.

In one embodiment, the vehicle engagement features can include one or more user-operated vehicle features, which are vehicle features that are initiated or otherwise controlled by a vehicle user. For example, a vehicle user can operate a windshield wiper switch that then sends a signal to the BCM 24, which then controls the windshield wipers 48—this example describes a user-operated vehicle feature. In one embodiment, the vehicle information stored in database(s) 124 can include information concerning various vehicle system modules (VSMs) and electronic architectures of various vehicles. Moreover, this information can be associated with a corresponding vehicle (or type of vehicle) and, also, this association can be stored in the vehicle feature information database 122 and/or other database(s) 124.

In one embodiment, the vehicle feature information database 122 (or other database(s) 124) can include vehicle specification information. The vehicle specification information can include information concerning specifications of the vehicle, such as make, model, model-year, standard features (e.g., standard sensors), optional features (e.g., optional sensors), aftermarket features (e.g., aftermarket sensors), vehicle system module (VSM) information (e.g., vehicle sensor and vehicle feature information), vehicle networking information (e.g., networking or user equipment (UE) information, including wireless subscriber information of a telematics unit or other UE, supported networking functionality, device identifiers and/or addresses), VSM communication architecture information, serial data communication architecture information, and various other information pertaining to a particular vehicle, such as the vehicle 12. It should be appreciated that any or all of the information stored in the databases 122, 124 can be stored at one or more databases at one or more locations or facilities, and which may be operated and/or managed by one or more associated entities, including an OEM of the vehicles.

In one embodiment, the other database(s) 124 can include vehicle sensor information and this vehicle sensor information can include vehicle sensor data and other data concerning the vehicles. The vehicle sensor data can include information received from one or more onboard vehicle sensors of a particular vehicle, such as vehicles 12. The vehicle sensor data can include one or more vehicle sensor values, as well as a time indicator (e.g., timestamp associated with the sensor value), a vehicle identifier (e.g., vehicle identification number (VIN)), etc.

The server system 130 can be a vehicle notification server 130 and can include a vehicle notification application 138 that can be stored on memory 136 and executed by processor 134. The vehicle notification application 138 can receive one or more vehicle feature notification requests from the vehicle feature tracking server 110. In addition, the vehicle notification application 138 can be used to generate (or otherwise obtain) one or more vehicle feature notifications, which can include one or more vehicle feature engagement notifications and/or one or more vehicle feature usage notification. The vehicle feature engagement notification indicates certain vehicle feature operating instructions and/or a vehicle feature availability notification to be presented to a vehicle user. In one embodiment, the vehicle feature engagement notification includes vehicle feature operating instructions and/or a vehicle feature availability notification. And, in other embodiments, the vehicle feature engagement notification indicates a particular vehicle feature, and the device receiving the vehicle feature engagement notification (e.g., the vehicle 12, the HWD 90) can obtain vehicle feature operating instructions and/or a vehicle feature availability notification for that particular vehicle feature based on the vehicle feature engagement notification.

The vehicle feature operating instructions include operating instructions for carrying out (e.g., initiating, performing, executing) a vehicle feature, such as a user-operated vehicle feature. In one embodiment, the vehicle feature operating instructions specify a series of steps that a vehicle user is to take (e.g., a series of operating one or more vehicle-user interfaces in a particular manner) so as to carry out the vehicle feature. The vehicle feature availability notification is a notification that indicates that a vehicle feature is ready for use or is otherwise available. And, in some embodiments, the vehicle feature availability notification indicates that the vehicle feature is advisable for use at the present time. The vehicle feature usage notification is a notification that indicates that a vehicle feature has been engaged by the user and, in some embodiments, is a notification that indicates that a user-operated vehicle feature has been engaged by the user. In one embodiment, the vehicle feature usage notification indicates that the vehicle user has engaged with one or more vehicle features and information concerning the usage of such engaged vehicle features. For example, the vehicle feature usage notification can indicate that a vehicle feature has been "completed" or carried out for the first time by the vehicle user. Alternatively or additionally, the vehicle feature usage notification can be (or include) a vehicle user experience level that indicates a level of experience attributed to the vehicle user based on the usage of a plurality of vehicle features by the vehicle user.

With reference to FIG. 3, there is shown an embodiment of a method 300 of assisting user engagement of vehicle features. In one embodiment, the method 300 can be carried out by the remote facility 80, such as through any one or more of the vehicle feature tracking server 110 and the vehicle notification server 130. Although the steps of the method 300 are described as being carried out in a particular order, it is hereby contemplated that the steps of the method 300 can be carried out in any suitable order as will be appreciated by those skilled in the art.

The method 300 can be used in various scenarios, and may be initiated based on an indication that a new vehicle user is operating the vehicle. For example, when a user purchases a vehicle from a dealership, a new vehicle user indication can be sent to the remote facility 80, such as to the vehicle feature tracking server 110. The new vehicle user indication is any indication that indicates that a new user is going to or is operating the vehicle. For example, the new vehicle user indication can be an indication that the vehicle owner has changed. Or, in another embodiment, the new vehicle user indication can be an indication that a new vehicle user has reserved the vehicle 12 for use (e.g., as a part of a car sharing service). Or, in yet another embodiment, the new vehicle user indication can be an indication that the vehicle is being operated using a new (or different) vehicle key than that which was previously used to operate the vehicle.

In one scenario, the method 300 can keep track of vehicle feature engagement information for various users of the vehicle. For example, a first vehicle user may be the owner of the vehicle and a second vehicle user can be an individual that rented the vehicle as a part of a car sharing service. The method can be used to track certain vehicle features for the first vehicle user and to track certain vehicle features for the second vehicle user separately. And, in one embodiment, the vehicle feature usage of the vehicle users can be tracked with respect to a certain vehicle, or with respect to a certain vehicle type. For example, the second vehicle user may rent a first vehicle of a first vehicle type (e.g., a first model/model-year) and the method can be used to track vehicle feature usage for the second vehicle user. The second vehicle user may then rent a second vehicle that is of the first vehicle type (i.e., the same vehicle type as the first vehicle) and, in such a case, since the second vehicle user has already engaged in (or carried out) certain vehicle features for the first vehicle type, those already engaged in (or carried out) vehicle features may not be tracked again for the second vehicle—for example, step 310 can identify vehicle features that have not been already engaged in (or carried out) by the vehicle user for the certain vehicle type. In such embodiments, the method 300 can further include the steps of: identifying a vehicle user (e.g., using information from the HWD 90 or the vehicle 12); recalling vehicle feature engagement information for the identified vehicle user (e.g., which can be the present vehicle user as indicated by messages received from the vehicle); and carrying out the identifying step based on the vehicle feature engagement information, as discussed below.

The method 300 begins with step 310, wherein a vehicle engagement feature is identified from a plurality of vehicle engagement features. In many embodiments, this step can be carried out by the remote facility 80 and, in at least some embodiments, by the vehicle feature tracking server 110. In one embodiment, the vehicle engagement feature is a user-operated vehicle feature. This vehicle engagement feature can be identified based on those vehicle features that have not been carried out or engaged in by a vehicle user (or the vehicle). For example, considering an embodiment where the vehicle feature of operating the windshield wipers and the vehicle feature of operating the audio system are each a part of the master list of vehicle engagement features, when vehicle feature information stored on databases 122 indicates that the first vehicle user has engaged in operating the windshield wipers 48 and has not engaged in operating the audio system 56, the vehicle engagement feature of operating the audio system can be identified. And, in another example, considering an embodiment where the vehicle feature of operating the windshield wipers is a part of the master list of vehicle engagement features, when vehicle feature information stored on databases 122 indicates that the first vehicle user has engaged in operating the windshield wipers 48 for a first vehicle (or first vehicle type) and not for a second vehicle (or second vehicle type), the vehicle engagement feature of operating the windshield wipers can be identified for the second vehicle (or second vehicle type) even though the first vehicle user has already operated the windshield wipers of another vehicle (or another vehicle type). This scenario may be suitable or desirable when operation of the windshield wipers of one vehicle differs from that of another vehicle. And, in one embodiment, the databases can track vehicle features that are operated in the same or a similar manner among a plurality of various vehicle types (e.g., vehicle models).

In one embodiment, as mentioned above, the vehicle engagement features that have been used by a particular vehicle user and vehicle (or vehicle type) combination can be stored and then compared with the master list of vehicle engagement features so as to identify the vehicle engagement feature, which can be the next vehicle engagement feature to be tracked. This list of vehicle engagement features that have been used by a particular vehicle user and vehicle (or vehicle type) combination can be referred to as the vehicle user feature completion list.

In some embodiments, the vehicle engagement feature can be identified based on a vehicle operating state and/or a vehicle environmental state. For example, the vehicle feature tracking server 110 can receive vehicle sensor information from the vehicle 12 via the wireless carrier system 70 and/or the land network 76. This information can be information sensed or otherwise obtained by one or more of the onboard vehicle sensors 42-46, 49-54, and 62-66. For example, the precipitation sensor 49 can detect precipitation on a vehicle windshield (or window) and this information can be provided to the remote facility 80 (e.g., server 110). In response, the server 110 can determine that the vehicle windshield wiper feature should be identified at this time. Once the vehicle engagement feature is identified, the method 300 continues to step 320.

In step 320, vehicle feature trigger information is sent to a vehicle. In at least some embodiments, the vehicle feature trigger information is information used to detect a vehicle feature trigger that corresponds to the identified vehicle engagement feature. In some embodiments, in response to identifying a vehicle engagement feature, a vehicle feature trigger (or information thereof) corresponding to the identified vehicle engagement feature can be identified. For example, when the vehicle windshield wiper feature is identified, information requesting or instructing that the vehicle track or monitor for usage of the windshield wipers 48 can be sent to the vehicle. In one embodiment, the vehicle feature trigger information can be a vehicle command or vehicle sensor information that indicates usage of the identified vehicle engagement feature. For example, in the case of the vehicle windshield wiper feature being the identified vehicle engagement feature, the vehicle feature trigger information can be information indicating data corresponding to a vehicle command for initiating or activating the windshield wipers 48 and, in one example, can be in the form of information corresponding to vehicle sensor information indicating that a windshield wiper switch for controlling the windshield wipers 48 has been actuated by a vehicle user. The vehicle feature trigger information can include information that is used for comparison with vehicle sensor information (or vehicle commands) that are communicated over the communications bus 40 (and/or that are communicated to and/or from a particular VSM). And, additionally or alternatively, the vehicle feature trigger information can be computer instructions that can be executed by the vehicle (e.g., using processor 36) that is used to determine the occurrence (or triggering) of the vehicle feature trigger. The method 300 continues to step 330.

In step 330, a vehicle feature engagement notification is transmitted to the vehicle user. In one embodiment, this step can be carried out by sending the vehicle feature operating instructions and/or a vehicle feature availability notification to the vehicle 12 and/or the HWD 90. The vehicle 12 can then present the notification to the vehicle user using one or more vehicle-user interfaces, such as the audio system 56, and/or the HWD 90 can then present the notification to the vehicle user using one or more device-user interfaces, such as an audio speaker included as a part of the HWD 90. In another embodiment, the vehicle feature availability notification can inform the vehicle (or HWD) of a particular vehicle feature, which can then recall certain vehicle feature operating instructions and/or a vehicle feature availability notification from memory (e.g., memory 38, memory of the HWD). These vehicle feature operating instructions and/or the vehicle feature availability notification can then be presented at a device-user interface (e.g., audio system 56, speaker of the HWD).

In many embodiments, the vehicle feature engagement notification is transmitted to the vehicle user (e.g., vehicle 12, HWD 90) from the vehicle notification server 130. And, in one embodiment, the vehicle notification server 130 can obtain or generate the vehicle feature engagement notification in response to identification of the vehicle engagement feature. For example, the server 110 can notify the vehicle notification server 130 that a particular vehicle engagement feature has been identified and, in response, the server 130 can generate and/or send the vehicle feature engagement notification to the vehicle user. In one embodiment, the vehicle feature engagement notification can be recalled from memory (e.g., databases 140) based on a vehicle engagement feature identifier (i.e., an identifier that identifies the vehicle engagement feature uniquely with respect to the other vehicle engagement features). In this way, the vehicle can be configured to track usage of the vehicle engagement feature at the same (or approximately the same) time that the vehicle user is provided with the vehicle feature engagement notification, which can instruct the vehicle user how to use the vehicle engagement feature. The method 300 then continues to step 340.

In step 340, a vehicle feature usage indicator is received from the vehicle. The vehicle feature usage indicator is any indicator that indicates that a vehicle feature has been engaged by the user. In one embodiment, the vehicle feature usage indicator can be generated and/or sent from the vehicle based on the vehicle detecting the triggering or occurrence of the vehicle feature trigger that corresponds to the vehicle feature trigger information that was sent in step 320. In one embodiment, the vehicle feature usage indicator can include a vehicle feature identifier that identifies the vehicle feature, a vehicle identifier that identifies the vehicle, and/or a vehicle user identifier that identifies the vehicle user. The method 300 then continues to step 350.

In step 350, a vehicle feature usage notification is transmitted to the vehicle user. In many embodiments, the vehicle feature usage notification is generated in response to and/or based on the vehicle feature usage indicator received from the vehicle. For example, the vehicle feature usage indicator that indicates that the windshield wipers 48 have been operated by the vehicle user can be received at the vehicle feature tracking server 110 and then sent to the vehicle notification server 130. The vehicle notification server 130 can then generate and send the vehicle feature usage notification to the vehicle user (e.g., HWD 90, vehicle 12), which can then present the vehicle feature usage notification to the vehicle user. In at least some embodiments, the vehicle feature usage notification indicates that a particular vehicle feature has been carried out or engaged. And, in one embodiment, the vehicle feature usage notification can include a vehicle user experience level or other gamification indicator. The gamification indicator can be any indicator that is used to convey completion or progress of a set of vehicle features and that is designed to encourage or motivate a vehicle user to use of the set of vehicle features.

In one embodiment, the gamification feature can include the vehicle user experience level where the vehicle user can "level up" upon completing one or more vehicle features. For example, the vehicle user can increase from level 1 to level 2 (out of 99 levels) for completing a vehicle feature and the gamification indicator can indicate the vehicle user experience level and/or an increase in the vehicle user experience level. Additionally or alternatively, the gamification indicator can be a badge or title that can be presented to the vehicle user when the vehicle user achieves a certain vehicle user experience level or uses a certain vehicle engagement feature. And, in a particular embodiment, as the vehicle user experience levels increase, then "leveling up" (or increasing vehicle user experience level) can require more vehicle features (and/or more difficult or time-consuming vehicle features) to be completed. The method 300 then ends.

Figure 4:
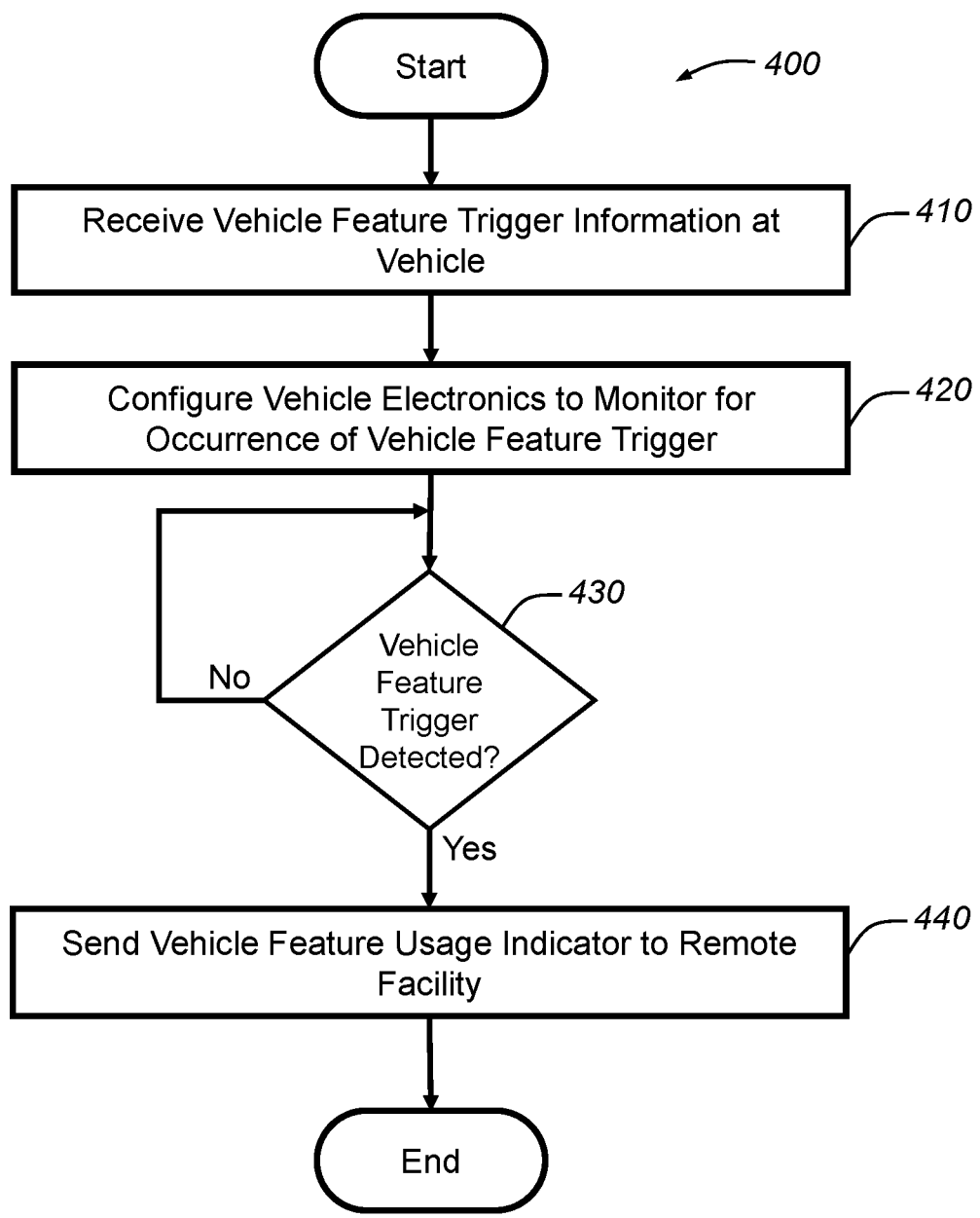
FIG. 4 is a flowchart of another embodiment of a method of assisting user engagement of vehicle features.

With reference to FIG. 4, there is shown an embodiment of a method 400 of assisting user engagement of vehicle features. In one embodiment, the method 400 can be carried out by the vehicle 12 and, in a particular embodiment, the method 400 can be carried out by the wireless communications device 30 and/or the BCM 24. Although the steps of the method 400 are described as being carried out in a particular order, it is hereby contemplated that the steps of the method 400 can be carried out in any suitable order as will be appreciated by those skilled in the art.

The method 400 begins with step 410, wherein vehicle feature trigger information is received at the vehicle. This vehicle feature trigger information can be received at the vehicle 12 as a result of step 320 of the method 300 (FIG. 3). As mentioned above, the vehicle feature trigger information can be sent in response to identifying a vehicle engagement feature (step 310 (FIG. 3)) and, in many embodiments, the vehicle feature trigger information corresponds to the identified vehicle engagement feature. The vehicle feature trigger information can be received at the wireless communications device 30 from the vehicle feature tracking server 110 via land network 76 and wireless carrier system 70. Once the vehicle trigger is received, the method 400 continues to step 420.

In step 420, the vehicle electronics are configured to monitor for the vehicle feature trigger. In one embodiment, the vehicle feature trigger information is (or includes) computer instructions that can be executed by the vehicle (e.g., using the processor 36, using the processor of the BCM 24) and that, when executed, causes the vehicle 12 to monitor or listen for (or otherwise detect) the occurrence of the vehicle feature trigger. In such cases, the vehicle electronics 20 can be configured to execute the computer instructions included in the received vehicle feature trigger information. In one embodiment, these vehicle feature trigger computer instructions can cause one or more VSMs to listen for certain information that is communicated over a vehicle communications bus, such as bus 40. For example, the vehicle can carry out typical vehicle functionality, which can include sending sensor information from a first VSM to a second VSM via the communications bus. In such a case, a third VSM can listen for certain sensor information (or other signals/information) that is communicated over the communications bus and that is not intended (according to typical vehicle operation) to be received at the third VSM—this can be referred to as passive listening. Additionally or alternatively, in some embodiments, the vehicle feature trigger information is (or includes) a vehicle command or vehicle sensor information that indicates usage of the identified vehicle engagement feature. The vehicle 12 can then listen for this particular information at a particular VSM (e.g., BCM 24) and/or over the communications bus 40.

In another embodiment, the vehicle feature trigger information includes information that identifies a vehicle feature that is to be tracked at the vehicle. For example, the vehicle feature trigger information can include a vehicle feature identifier and, based on the vehicle feature identifier, the vehicle 12 is configured to listen for usage of the vehicle feature identified by the vehicle feature identifier. This configuring of the vehicle can include recalling and executing (or otherwise activating) certain computer instructions that cause the vehicle (e.g., a processor included in vehicle electronics 20) to listen or monitor for usage of the vehicle feature identified by the vehicle feature identifier, which can be the identified vehicle engagement feature. The method 400 then continues to step 430.

In step 430, it is determined whether an occurrence (or triggering) of the vehicle feature trigger has occurred (or has been detected). In one embodiment, the vehicle feature trigger is detected based on detecting or receiving onboard vehicle sensor data from an onboard vehicle sensor. For example, when the identified vehicle engagement feature is the (or use of the) windshield wipers 48, then the vehicle can be configured to listen for an activation signal from a windshield wiper switch that is sent over a vehicle communications bus. In such a case, for example, the wireless communications device 30 or BCM 24 can be configured to listen for the activation signal from the windshield wiper switch and, when the activation signal is detected (or received), the occurrence of the vehicle feature trigger is detected. The method 400 then continues to step 440 when the occurrence of the vehicle feature trigger is detected.

In step 440, a vehicle feature usage indicator is sent to the remote facility. In many embodiments, the vehicle feature usage indicator is sent to the remote facility in response to detecting the occurrence (or triggering) of the vehicle feature trigger (step 430). The vehicle feature usage indicator can be generated at the vehicle and, in one embodiment, can be generated at the vehicle in response to detecting the occurrence (or triggering) of the vehicle feature trigger. In one embodiment, a first VSM (e.g., the BCM 24) can detect the occurrence (or triggering) of the vehicle feature trigger and, in response to this detection, the first VSM can send a first vehicle feature usage indicator to a second VSM (e.g., the wireless communications device 30). The second VSM then can send a second vehicle feature usage indicator to the remote facility, where the second vehicle feature usage indicator indicates or identifies the vehicle feature that was detected as being triggered or used. And, in some embodiments, the second vehicle feature usage indicator can be the same as the first vehicle feature usage indicator, or at least can include information from the first vehicle feature usage indicator that identifies the triggered vehicle feature. In one embodiment, the vehicle feature usage indicator is sent using the wireless communications device 30 to the vehicle feature tracking server 110 via wireless carrier system 70 and/or land network 76. The method 400 then ends.

In some embodiments, a plurality of vehicle engagement features can be identified and sent to the vehicle at the same time. And, in one embodiment, the vehicle can preconfigured to detect one or more vehicle feature triggers, such as through configuring the vehicle with these vehicle feature triggers during manufacturing of the vehicle. Also, each of these vehicle feature triggers can be associated with a vehicle user response (or vehicle feature usage notification) that is stored at the vehicle. For example, in response to detecting the occurrence of wheel slippage over a threshold wheel slippage amount, the vehicle can automatically present a notification to the vehicle user that compliments the vehicle user on successfully navigating a wet road and that warns the vehicle user to drive slower on wet roads. In another embodiment, the vehicle can send vehicle feature usage indicator (e.g., an indication that the vehicle user operated the vehicle when a certain amount of wheel slippage was detected) to the server 110, which can then instruct the vehicle notification server 130 to send the notification to the vehicle user.

In some embodiments, the gamification indicator discussed in step 350 of the method 300 (FIG. 3) is an indicator of vehicle user experience points (XP) attributed to the vehicle user. For example, the vehicle feature tracking server 110 (or other remote server system) can attribute vehicle user XP to the vehicle user when the vehicle user engages in a vehicle engagement feature, such as the user-operated vehicle features or other vehicle engagement features. And, in one example, particular vehicle engagement features can be associated with a particular amount of vehicle user XP that is gained by the vehicle user upon completing or engaging in the vehicle engagement feature. In one embodiment, each vehicle user experience level is associated with a predetermined amount of vehicle user XP and, once the vehicle user acquires an amount of vehicle user XP greater than or equal to the predetermined amount of vehicle user XP, the vehicle user experience level can be increased (or "leveled up"). And, in a particular embodiment, as the vehicle user experience level increases, the amount of vehicle user XP needed to level up can be increased so that leveling up at higher vehicle user experience levels requires more vehicle feature usage (or vehicle feature usage of a more time consuming or otherwise difficult nature).

In another embodiment, the vehicle feature tracking system can be configured to use artificial intelligence (AI) techniques to learn and/or adapt execution of the method 300 and/or the method 400. For example, the vehicle can send vehicle state information to the remote vehicle feature tracking server 110 that indicates a HWD has been connected to the vehicle 12 and, in response, the server 110 can identify a vehicle engagement feature of using phone dialing features with the vehicle (e.g., using vehicle-user interfaces to carry out a call of the HWD 90) (see step 310 of the method 300 (FIG. 3)). In response, the server 110 can send a vehicle feature engagement notification to the vehicle user that describes how the phone dialing feature can be used to place calls using the vehicle-user interfaces of the vehicle 12 (step 330 (FIG. 3)), as well as the corresponding vehicle feature trigger information (step 330 (FIG. 3)). This response of sending the vehicle feature engagement notification and listening or monitoring for the vehicle feature trigger (e.g., use of the phone dialing feature) at the vehicle can be performed for a variety of vehicle users and/or vehicles. However, through using AI techniques, the system can detect that when the HWD is connected, many users do not use the phone dialing feature even in spite of the vehicle feature engagement notification that presents operating instructions on how to use this phone dialing feature to the vehicle user. And, moreover, through using AI techniques, the system can detect that when the HWD is connected, that the vehicle user operates a vehicle-user interface (e.g., a menu on touch-screen display 50) so that the vehicle plays audio from the HWD. Thus, the AI techniques can be used to adapt to such a scenario by, for example, identifying a vehicle engagement feature related to streaming audio from a HWD, such as a vehicle engagement feature of enabling the vehicle to automatically stream audio from a particular HWD when the HWD is connected to the vehicle. Thus, in future instances of carrying out the method, this HWD automatic audio streaming feature can be identified in response to vehicle state information that indicates a HWD has been connected to the vehicle. Thereafter, a corresponding vehicle feature engagement notification can be sent to the vehicle user and corresponding vehicle feature trigger information can be sent to the vehicle.

In one embodiment, the method 300, the method 400, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory at servers 82, memory 38, memory of the BCM 24), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of assisting user engagement of vehicle features, the method comprising:
   identifying a vehicle engagement feature from a plurality of vehicle engagement features;
   sending vehicle feature trigger information to a vehicle, the vehicle feature trigger information being information used to detect an occurrence of a vehicle feature trigger that corresponds to the identified vehicle engagement feature;
   transmitting a vehicle feature engagement notification to a vehicle user of the vehicle, the vehicle feature engagement notification including vehicle feature operating instructions and/or a vehicle feature availability notification;
   obtaining a vehicle feature usage indicator, the vehicle feature usage indicator indicating that the vehicle user has engaged the identified vehicle engagement feature, wherein the vehicle feature usage indicator is generated by the vehicle in response to detection of the occurrence of the vehicle feature trigger at the vehicle;
   updating a vehicle user experience level based on the vehicle user's engagement with the identified vehicle engagement feature, wherein the vehicle user experience level is updated each time an indication is received indicating that the vehicle user has engaged with one of the plurality of vehicle engagement features; and
   providing a vehicle feature usage notification to the vehicle user, wherein the vehicle feature usage notification indicates the vehicle user experience level.

2. The method of claim 1, further comprising a step of receiving vehicle state information from the vehicle and, in response to receiving the vehicle state information from the vehicle, carrying out the identifying step based on the received vehicle state information.

3. The method of claim 1, wherein the plurality of vehicle engagement features are stored as a predetermined master list of vehicle engagement features that are to be monitored for the vehicle user.

4. The method of claim 1, wherein the identifying step is carried out at a vehicle feature tracking server and wherein the transmitting step is carried out at a vehicle notification server in response to the vehicle notification server receiving an indication of the identified vehicle engagement feature from the vehicle feature tracking server.

5. The method of claim 4, wherein the vehicle feature usage indicator is received at the vehicle feature tracking server from the vehicle, the vehicle feature tracking server being separate from the vehicle notification server.

6. The method of claim 4, wherein the vehicle feature usage indicator is sent to the vehicle feature tracking server, and wherein the vehicle feature usage notification is provided by the vehicle notification server to the vehicle user in response to the vehicle notification server receiving the vehicle feature usage indicator from the vehicle feature tracking server.

7. The method of claim 1, wherein the vehicle user experience level is based on vehicle user experience points for the vehicle user that are accumulated each time the vehicle user engages with one of the plurality of vehicle engagement features.

8. The method of claim 7, wherein the vehicle constitutes a first vehicle that is of a first vehicle type, wherein the vehicle user experience points constitute a first instance of vehicle user experience points that represent an extent to which the vehicle user has engaged with the plurality of vehicle engagement features for the first vehicle type, wherein the first instance of vehicle user experience points are updated based on the vehicle user's engagement with the plurality of vehicle engagement features at the first vehicle and at a second vehicle that is of the first vehicle type, and wherein a second instance of vehicle user experience points are tracked for the vehicle user, the second instance of vehicle user experience points represent an extent to which the vehicle user has engaged with one or more vehicle engagement features for a second vehicle type that is different than the first vehicle type.

9. The method of claim 1, wherein the vehicle feature trigger information includes computer instructions that are executable by a processor of the vehicle.

10. The method of claim 1, wherein the vehicle feature trigger information identifies the identified vehicle engagement feature, and wherein the vehicle is configured to activate tracking of the identified vehicle engagement feature, which is carried out by listening for an occurrence of the vehicle feature trigger.

11. A method of assisting user engagement of vehicle features, the method being carried out by vehicle electronics of a vehicle, and wherein the method comprises:
receiving vehicle feature trigger information at the vehicle, the vehicle feature trigger information being information used to detect an occurrence of a vehicle feature trigger that corresponds to a vehicle engagement feature;
in response to receiving the vehicle feature trigger information at the vehicle, automatically configuring the vehicle electronics of the vehicle to monitor for an occurrence of the vehicle feature trigger;
after the configuring step, detecting the occurrence of the vehicle feature trigger at the vehicle; and
when the occurrence of the vehicle feature trigger is detected at the vehicle, sending a vehicle feature usage indicator from the vehicle to one or more remote facilities, wherein the one or more remote facilities are configured to: (i) update a vehicle user experience level in response to receiving the vehicle feature usage indicator, wherein the vehicle user experience level is updated each time an indication is received indicating that the vehicle user has engaged with one of a plurality of vehicle engagement features; and (ii) provide a vehicle feature usage notification to the vehicle user, wherein the vehicle feature usage notification indicates the vehicle user experience level.

12. The method of claim 11, wherein the vehicle feature trigger information is received as a part of a manufacturing process of the vehicle.

13. The method of claim 11, wherein the vehicle feature trigger information is received at the vehicle from the one or more remote facilities.

14. The method of claim 11, wherein the vehicle feature trigger information includes computer instructions particular to the vehicle engagement feature and wherein the occurrence of the vehicle feature trigger is detected through executing the computer instructions on a first processor of the vehicle electronics.

15. The method of claim 14, further comprising a step of executing the computer instructions using the first processor of the vehicle electronics, wherein execution of the computer instructions causes the first processor to listen for onboard vehicle sensor information corresponding to the vehicle engagement feature that is sent over a communications bus included as a part of the vehicle electronics.

16. The method of claim 15, wherein the onboard vehicle sensor information is sent by an onboard vehicle sensor to a second processor of the vehicle electronics, the first processor being separate from the onboard vehicle sensor and the second processor.

17. The method of claim 11, further comprising a step of receiving the vehicle feature usage notification from the one or more remote facilities, wherein the vehicle feature usage notification is received in response to the sending step.

18. The method of claim 11, further comprising steps of:
receiving a vehicle feature engagement notification, wherein the vehicle feature engagement notification includes vehicle feature operating instructions that instruct a vehicle user how to activate or operate the vehicle engagement feature using one or more vehicle inputs, and wherein the vehicle engagement feature is a user-operated vehicle feature; and
presenting the vehicle feature operating instructions on a vehicle-user interface of the vehicle electronics;
wherein the detecting step further comprises determining whether the vehicle user activated or operated the vehicle engagement feature by operating the one or more vehicle inputs according to the vehicle feature operating instructions.

19. The method of claim 18, wherein the one or more vehicle inputs include inputs received from one or more vehicle-user interfaces.

20. The method of claim 11, wherein the method is carried out using at least one computer program executing on at least one processor of the vehicle electronics, and wherein the at least one computer program is stored on a non-transitory computer readable medium of the vehicle electronics.

\* \* \* \* \*